United States Patent [19]

Michel

[11] Patent Number: 4,592,454

[45] Date of Patent: Jun. 3, 1986

[54] HYDROPNEUMATIC SYSTEM FOR RECOVERING BRAKING ENERGY FOR URBAN VEHICLES

[75] Inventor: Robert Michel, Paris, France

[73] Assignee: Renault Vehicules Industriels, Lyons, France

[21] Appl. No.: 495,024

[22] Filed: May 16, 1983

[30] Foreign Application Priority Data

May 19, 1982 [FR] France .............................. 82 08855

[51] Int. Cl.⁴ .................... F16D 33/00; B60K 25/06
[52] U.S. Cl. .................. 192/3.23; 192/4 B; 74/687; 74/720.5; 180/165; 60/414
[58] Field of Search ............. 192/4 B, 3.23; 74/687, 74/720.5, 752 C, 752 A, 720, 677, 718, 730, 731; 60/414; 180/165

[56] References Cited

U.S. PATENT DOCUMENTS

| | | | |
|---|---|---|---|
| 3,869,939 | 3/1975 | Miyao et al. | 74/720.5 |
| 3,903,696 | 9/1975 | Carman | 180/165 |
| 3,969,958 | 7/1976 | Miyao et al. | 74/720.5 |
| 4,064,694 | 12/1977 | Baudoin | 180/165 |
| 4,132,283 | 1/1979 | McCurry | 180/165 |
| 4,168,611 | 9/1979 | Woyton et al. | 74/752 C |
| 4,175,389 | 11/1979 | Shiber | 60/414 |
| 4,215,545 | 8/1980 | Morello et al. | 60/414 |
| 4,240,515 | 12/1980 | Kirkwood | 180/165 |
| 4,242,922 | 1/1981 | Baudoin | 74/687 |
| 4,305,254 | 12/1981 | Kawakatsu et al. | 60/716 |
| 4,351,409 | 9/1982 | Malik | 60/414 |
| 4,372,414 | 2/1983 | Anderson et al. | 74/687 |
| 4,382,392 | 5/1983 | Meyerle et al. | 74/687 |

FOREIGN PATENT DOCUMENTS

| | | | |
|---|---|---|---|
| 0047642 | 9/1981 | European Pat. Off. | |
| A2408775 | 6/1979 | France | |
| 2408775 | 7/1979 | France | 60/414 |
| 2419436 | 10/1979 | France | |
| A2423365 | 11/1979 | France | |
| 2467095 | 4/1981 | France | |
| 2482692 | 11/1981 | France | 74/687 |
| 8000504 | 7/1980 | Netherlands | 74/687 |
| 2011560 | 7/1979 | United Kingdom | 74/730 |

Primary Examiner—Rodney H. Bonck
Assistant Examiner—Alan G. Towner
Attorney, Agent, or Firm—Beveridge, DeGrandi & Weilacher

[57] ABSTRACT

Hydropneumatic system for recovering braking energy for a vehicle comprising a power "shunt" transmission, characterized in that it comprises two hydraulic switches (19 and 20) or equivalent devices, the first of which permits two hydraulic machines or sets of machines (3a, 4a) to be combined or opposed and the second of which (20) enables the two-direction lines joining these machines to the hydropneumatic accumulator (17) and a low-pressure reservoir (18) to be connected straight through or crossed-over.

Their operation enables the cylinder capacities of the machines to be controlled so as to store or restore the deceleration energy.

8 Claims, 6 Drawing Figures

HYDROPNEUMATIC SYSTEM FOR RECOVERING BRAKING ENERGY FOR URBAN VEHICLES

The invention relates to the recovery of braking energy on a vehicle, particularly an urban vehicle like a bus which is subject to frequent braking and starts.

Thus, in passenger transport vehicles it is particularly advantageous, to cut down consumption, to recover the deceleration energy normally dissipated in the brakes and to reintroduce it into the drive train in the speeding up phase.

Certain passenger transport vehicles use a flywheel, an electric accumulator or a hydropneumatic accumulator for that purpose. In the latter case a hydrostatic element is generally used which functions as a pump or motor so as to fill and empty the accumulator. This element is added onto the conventional automatic transmission, generally on the motion take-off.

In the case of transmissions using hydrostatic elements in the actual transmission, they are awkward to apply for charging and discharging the hydropneumatic accumulator, notably in the case of so-called power "shunt" transmissions, which seem to be the only ones which can assure both continuity and the good efficiency needed by a passenger transport vehicle.

In this direction known systems are fitted to "coupled output" type continuous transmissions where the hydraulic machines are connected to the wheels essentially by the action of a mechanical brake locking a differential train. However this operation leads to disturbances in the transmission which adversely affect the vehicle's longitudinal handling and furthermore the efficiency of such a system is pretty average.

Amongst power "shunt" type hydrostatic transmissions there is one which is particularly interesting, described in French Pat. No. 80 10 953 (2 482 692) in the aplicant's name for a "continuously varying transmission with two operating modes". Such a transmission is essentially based on using a double differential or four-shaft mechanism, two of the shafts being coupled to hydrostatic machines, with the ratios being spaced so that the transmission can provide a hydrokinetic torque converter starting phase followed by an operating mode having high efficiency due to the fact that the power taken off and shunted through the hydrostatic machines amounts to only a small proportion of the drive power.

The purpose of the invention is to use all the elements making up such a transmission so as to also provide for the storage and restoration of braking energy in a hydropneumatic accumulator, without this leading to increased complexity of the transmission machinery itself, differentials and hydrostatic machines.

The invention combines the mechanical and hydraulic components of a transmission of the above-mentioned type and at least one hydropneumatic accumulator tank, an electronic logic system operating electrohydraulic switching components so as to connect various components together, notably the pumps and hydraulic motors and the accumulator tank, so as to obtain the various braking phases desired, with or without recovery, and the various mixed or hybrid drive phases desired on the hydropneumatic accumulator and the internal combustion engine.

Apart from the electrohydraulic switching devices used to control the various brakes and clutches and also the volume ratios of the hydraulic motors and pumps, which are the same as those already provided for and used in the above-mentioned transmission, the invention provides for additional electrohydraulic switching devices consisting basically of two electrohydraulic reversing switches having crossed and parallel connections, positioned so that the first is located in the two-direction circuit connecting the hydrostatic pump to the hydrostatic motor and the second is located in the two-direction circuit connecting the pump to the hydropneumatic accumulator and to the low pressure reservoir.

The detail of the connections and functions provided will be brought out in the following description of an embodiment taken as an example and described with reference to the appended drawings in which.

Figure 1:
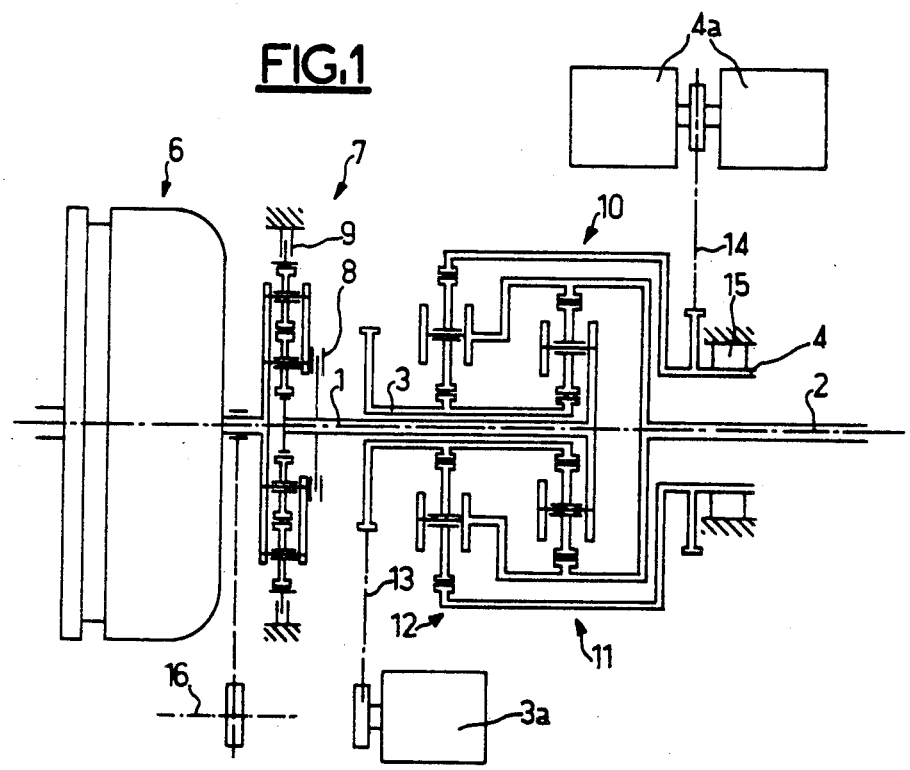
FIG. 1 shows the state of the art of the mechanical solution chosen for the example quoted.

The invention is based, as is the above-mentioned patent, on the application of a differential mechanism with four shafts 1, 2, 3 and 4. In the following example the mechanism used differs from those already described in the above-mentioned patent, but it also involves a known mechanism and it goes without saying that the invention would also apply to any other type of four-shaft mechanism.

According to the state of the art described in the above-mentioned patent, the internal combustion engine 5 is connected to the transmission via a conventional torque converter 6, fitted with a lock-up clutch (not shown). The torque converter output turbine shaft is connected to a reversing gear 7 providing for switching between forward drive and reverse drive and which consists, for example, of an epicyclic gear train with two sets of planet wheels; the forward drive is obtained by locking the whole unit by a controlled multiplate clutch 8, whilst the reverse drive is obtained by locking the annulus to the casing by means of a controlled brake 9. As set forth in the above-mentioned patent, this reversing mechanism could, in a variant, be located on the output shaft 2. To simplify them this reversing system has not been drawn on the schematics in FIGS. 2 and 4.

The four-shaft mechanism chosen in the selected example and designated overall by 10 is of the common sun wheel Simpson train type. The two trains are designated respectively by 11 and 12 overall in FIG. 1.

The input shaft 1 is connected to the train planet carrier 11, whilst the output shaft 2 connects both the annulus of train 11 and the planet carrier of train 12. Shaft 3 forms the sun wheel shared by the two trains 11 and 12 and is connected to a hydrostatic machine 3a by means of a chain drive 13. Shaft 4, fixed to the annulus of train 12, is connected by another line 14 to a set of two hydrostatic machines 4a mounted in opposition to each other. In addition, this shaft 4 is fitted with a freewheel 15 acting on the casing so as to prevent reverse rotation of this shift and thus relieve the hydraulic machines 4a in the starting phase.

Figure 2:
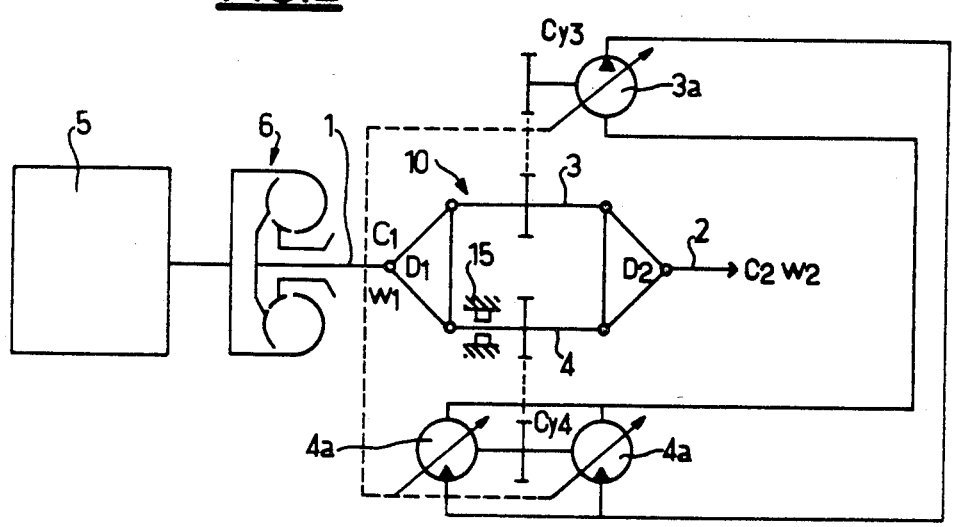
FIG. 2 shows the mechanical and hydraulic schematic of this transmission according to the state of the art.
Figure 4:
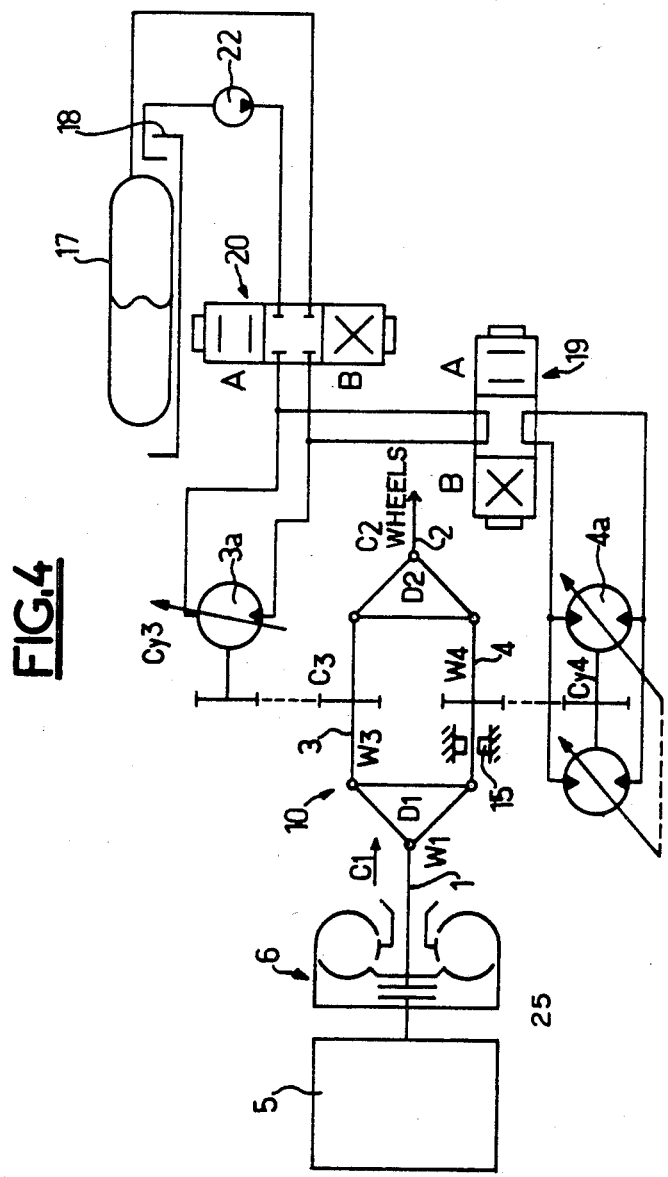
FIG. 4 is a similar schematic to the one shown in FIG. 2 showing the modifications made by the invention.

In FIGS. 2 and 4 this four-shaft system is shown schematically as equivalent to two conventional three-shaft differentials $D_1$ and $D_2$, but this is only to simplify the schematics since these differentials $D_1$ and $D_2$ are not equivalent separately and respectively to trains 11 and 12 but only when taken together.

Figure 3:
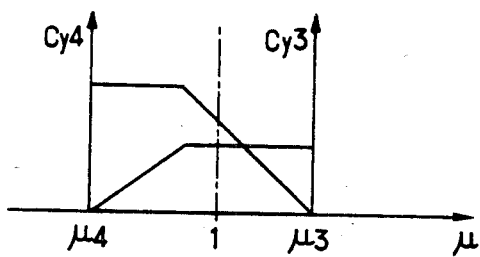
FIG. 3 shows the graphs of the variation of the cylinder capacities of the hydraulic machines plotted against the required transmission ratios, again according to the state of the art.

The operation of this whole unit, described in the above-mentioned patent, naturally means that a pure transmission can be provided with no braking energy recovery function. Machines 3a and 4a then respectively carry out the role of pump and motors in the phase in which the internal combustion engine drives the vehicle and inversely when the vehicle decelerates. These machines are then simply connected together hydraulically as shown in FIG. 2. The setting of the cylinder capacities Cy3 and Cy4 of these machines, performed in accordance with the curves shown in FIG. 3, then imposes a speed ratio $\mu = w2/w1$ between the output 2 and the input 1 shafts of the transmission. Naturally this control of the capacities of the cylinders of machines 3a and 4a, along with control of the various clutches, such as clutch 8, brakes such as brake 9 and the lock-up clutch, is provided by hydraulic means fed by an auxiliary pump 16 shown in FIG. 1 and by means of electrohydraulic switching means manually or automatically controlled which have not been shown in detail.

Figure 6:
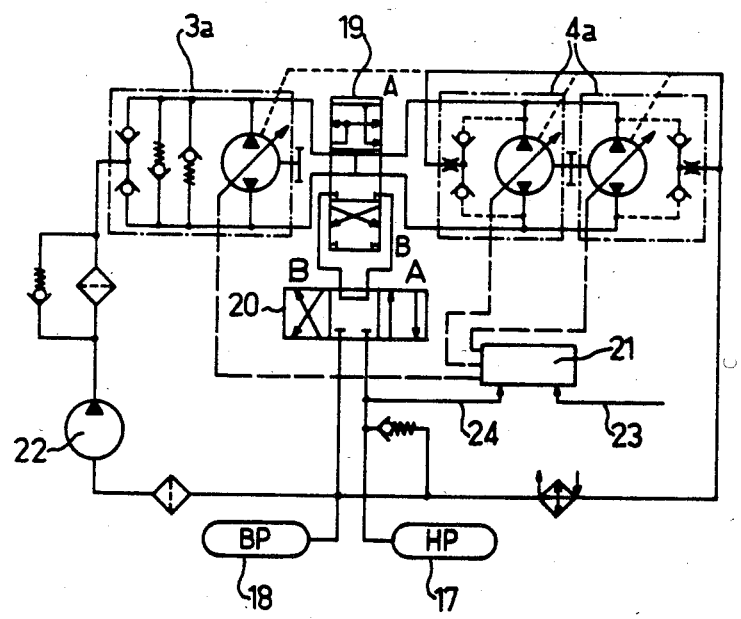
FIG. 6 gives a more detailed hydraulic schematic of the embodiment.

The present invention, shown schematically in FIG. 4 consists in combining all the mechanism and components previously described with a high-pressure hydropneumatic accumulator 17 combined with a low-pressure reservoir 18, on the one hand, and a set of two electrohydraulic swithces 19 and 20 on the other hand; these are shown in FIG. 4 and controlled, at the same time as the set of other electrohydraulic switches, by an electronic computer 21 which is shown in FIG. 6 only.

The switch 19, shown schematically in FIG. 4 as a hydraulic directional control valve, is placed in the two-direction circuit connecting machines 3a and 4a so as to provide for direct connection or for these connections to cross over. However, if one of hydrostatic machines 3a and 4a at least were replaced by machines of four-quadrant or reversible type, i.e. with positive and negative cylinder capacities, this would be a means equivalent to this switch 19. Switch 20, also shown as a hydraulic directional control valve, is inserted in the two-line two-direction circuit connecting machine 3a to the high-pressure accumulator 17 and the low-pressure reservoir 18.

In addition to these two switches, or to their equivalent, the feed pump 22 will be noticed in FIGS. 4 and 6; this pump is already used in the state of the art to keep the low-pressure circuit pressurized in spite of leaks. In the hybrid motor according to the invention this pump must provide the low-pressure pressurization of all the output absorbed by the hydraulic elements, which may justify different sizing. This pump preferably consists of a centrifugal pump supplying a low pressure of 10 bars, but a positive-displacement pump with variable cylinder capacity could also be used. Thus the low-pressure reservoir 18 connected to the atmosphere and the feed pump 22 taken together play the same part as the conventional low-pressure accumulator found in hybrid systems.

The various operating phases of the hybrid system according to the invention and the conditions imposed in the computer 21 for producing these phases will now be examined in detail.

Figure 5:
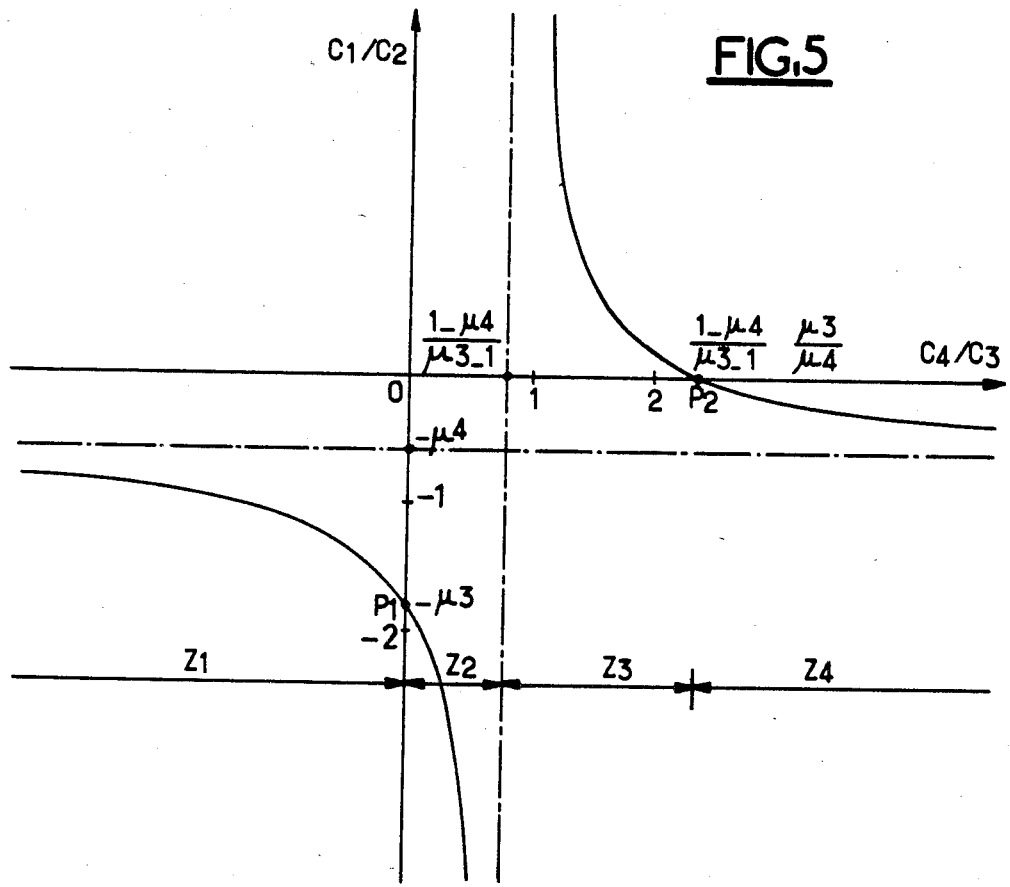
FIG. 5 shows the theoretical graph of transmission torque variation as a function of the transmission ratios.

A theoretical study of the hydraulic power "shunt" connection with a four-shaft mechanism shows that this system has one important feature. If $\mu 3$ and $\mu 4$ are the symbols for the special ratios of w2/w1 which cancel out the speeds w3 and w4 of shafts 3 and 4, the relationship which governs the ratio of the input torques to the mechanism C1/C2 according to the ratio of the torques applied by the hydraulic system C4/C3 can be represented by an equilateral hyperbola as shown in FIG. 5. This curve cuts the vertical axis at a point $P_1$ with ordinate $-\mu 3$ and the horizontal axis at a point $P_2$ with abscissa $(1-\mu 4)/(\mu 3-1)\times \mu 3/\mu 4$, and it comprises a horizontal asymptote with ordinate $-\mu 4$ and a vertical asymptote with abscissa $(1-\mu 4)/(\mu 3-1)$.

With w2/w1 positive this means that four operating zones can be defined on the graph in FIG. 5;

zone Z1 is the zone used in pure transmission in operation between the two privileged adaptation points ($\mu 4$ and $\mu 3$);

zone Z2 is a power regeneration zone in pure transmission;

zone Z3 is such that the sum of the "input powers" input through shafts 1 and 2 goes towards shafts 3 and 4 and vice versa; and finally, zone 4 is such that the difference between "input powers" (2−1) is injected into the hydraulic system (3+4) or vice versa.

Point P2 is a particular point where torque C1 is zero whatever the value of C2, which means that the engine input is then disconnected from the rest of the mechanism and that the engine operates in "floating" mode.

It must be remembered that the aim of the invention is to use the hydraulic machines 3a and 4a to store and restore the braking energy present on the output shaft (C2w2). We shall therefore examine the storage and restoration of this energy in order.

With respect to storage:

With the vehicle being driven with a speed V corresponding to a shaft 2 speed w2, the torque C2 on this shaft is controlled by adjustment of the ratio of torques C4/C3 to such a value that torque C1 is zero or approximately zero as has just been seen. This is achieved by an adjustment of the particular ratio of cylinder capacities Cy3 and Cy4, since at any time we have:

$$C3 = k3Cy3 \cdot p \text{ and } C4 = k4Cy4 \cdot p$$

where k3 and k4 are fixed transmission ratios between the hydraulic machines 3a and 4a and the corresponding shafts of the four-shaft mechanism, which transmission consists, in the example given, of chains 13 and 14. The hydraulic circuit then has its switch 19 in such a position A that the three machines 3a and 4a play the same role, and its switch 20 in a position A corresponding to braking. These two positions A correspond in the schematics to the parallel connections. The three hydraulic machines 3a and 4a then act as pumps and discharge into the high-pressure hydropneumatic accumulator 17 (up to 400 bars, for instance).

In addition to the ratio of cylinder capacities Cy4/Cy3, the absolute value of cylinder capacity Cy4 is determined by the computer 21 in accordance with the indication received by 23 of the deceleration torque to be produced and in accordance with the indication received by 24 of the pressure obtaining at any time in the accumulator 17.

This deceleration torque obtained by the hydraulic system is furthermore combined with the overall braking action and is subtracted from the torque of the conventional brakes acting on the axle under consideration, as applied in a known manner in so-called combined braking systems. This means that safety braking can be assured at all times whatever level the accumulator may be filled to and does not detract from the adhesion balance needed for road-holding.

Moreover, during this deceleration with controlled torque, the internal combustion engine 5 has its speed regulated so as to maintain at all times, and therefore for each vehicle speed, an I.C. engine speed such that the hydraulic elements 3a and 4a and also the mechanism 10 do not acquire abnormal speeds and so that the decelerating effect is adequate. This adjustment may, for example, correspond to the maximum speed of the engine.

In order to provide this control it is possible either to use an all-speed type fuel injection pump which is indexed for each vehicle speed by the computer 21, or, more advantageously, to set the ratio Cy4/Cy3 no longer at point P2 which cancels C1 exactly, but a little further to the right in zone Z4 by reducing the cylinder capacity Cy3. The engine then takes part, through its braking torque, in decelerating the vehicle without consuming fuel.

This operation is assured until the engine is no longer locked up. Beyond that point, i.e. for low vehicle speeds, the racing of shaft 1, which is no longer put under load by the torque converter turbine, redisplaces the cylinder capacity balance to keep C1 zero. Braking is thus possible up to the proximity of zero vehicle speed.

If the high-pressure accumulator 17 occasionally reaches the maximum load pressure (for example 400 bars), the value of all the cylinder capacities together, which for a given torque has already fallen off owing to the increase in pressure, is reduced to zero by the computor 21 and mechanical braking takes over from the transmission, since it is no longer possible to recover any more energy. Furthermore, in all circumstances, as soon as the vehicle speed drops below the minimum setpoint speed this cylinder capacity cancelling operation is commanded and switch 20 returns to its neutral position as soon as braking stops.

For restoring energy:

Each time the vehicle starts the computer 21 tests the filling pressure level of accumulator 17. If the pressure is less than a setpoint value the computer controls switches 19 and 20 for changeover to pure transmission, i.e. with switch 19 in position B and switch 20 at rest in the drive phase.

If the accumulator 17 is considered to be full enough when the test is made, the computer decides on its application by placing switch 19 in position A with zero cylinder capacities. Starting on the torque converter 6 is carried out as in pure traction, i.e. by locking on the freewheel 15. If the driver wishes to brake during this phase the computer 21 repositions the switch 20 in the above position.

At the end of the torque converter phase the computer decides on lock-up in the conventional way by actuating the lock-up clutch for a specific rate of slip of the speed of shaft 1 compared with the engine shaft speed. In the present case this action simultaneously triggers the energy restoration action by putting switch 20 into position B.

The torque required by the driver and transmitted by 23 is translated by the computer in accordance with the pressure obtaining in the accumulator and transmitted via 24 into a cylinder capacity ratio command. Two cases then need to be considered:

(1) If the accumulator loading allows this torque to be achieved hydraulically only, the computer 21 acts to neutralize the engine 5 and make it "float" as explained above; the only parameter to be controlled is its speed in accordance with the vehicle speed. This action is carried out as set forth above by operating the injection pump or by a slight shift in the operating point beyond point P2. The computer then adjusts the absolute value of cylinder capacities Cy4 and Cy3 to obtain the required torque all the time.

(2) If, on the other hand, the accumulator loading does not allow the required torque to be achieved, the ratio of cylinder capacities Cy4/Cy3 is shifted by reducing Cy3, which leads to participation by the engine which, whilst being speed-controlled as in the previous example, supplies torque on shaft 1, and this power is added on to the hydraulic power.

When the driver modulates his acceleration during a speed "plateau", or changes over to braking, switch 20 is operated in such a direction as to isolate the accumulator and then reverse the circuits.

If the discharge results in the accumulator being brought down to the minimum pressure threshold before the driver initiates the deceleration phase, the computer warns the conductor as this situation approaches and then proceeds to:

isolate the accumulator by acting on the switch 20 to bring it to the neutral point; however this operation is not essential in the case of accumulators which can go as far as discharging with no dead volume;

put the switch 19 back into the neutral position;

set the optimum cylinder capacities in accordance with the vehicle speed, which occurs with no torque, since switch 19 is in the position which enables the outputs to be looped; and finally put switch 19 into position B.

The same procedure can be performed on a call for maximum power, produced by the driver for example.

To sum up, the application of the hybrid solution according to the invention makes it possible with a minimum of additional components, basically switches 19 and 20 along with the computer 21 and also, naturally, the hydropneumatic accumulator 17, to provide optimum energy recovery, naturally within the limits of the accumulator capacity, with, in addition, automatic and practically continuous changes through all the necessary phases of torque converter drive, then without the converter with or without restoration, and of braking with or without recovery, and this by simply operating the switches and also the cylinder capacity controls.

I claim:

1. A hydropneumatic system for recovering braking energy for a vehicle which has a "power shunt" transmission, comprising, a transmission including a differential mechanism which has four shafts, said shafts including an input shaft which is connectible by a torque converter to an engine, an output shaft which is connectible to vehicle wheels, and two shafts which are connectible to two hydraulic machines, and a freewheel on one of said shafts to prevent rotation thereof when starting on the torque converter; two hydraulic machines which are driven by said two shafts of the transmission, said hydraulic machines having variable capacity cylinders, a hydropneumatic accumulator connected by conduits to the hydraulic machines and being connectible to said hydraulic machines while said input shaft is being driven to provide for hybrid operation of the system, two hydraulic switches in said conduits, electronic computer means for controlling the hydraulic switches and the hydraulic machines, said computer means being operable to change the capacities of the cylinders of the hydraulic machines to provide automatic and continuous control of the transmission throughout its various operating phases, said operating phases including phases when a first one of the hydraulic switches changes the transmission from pure mechanical drive mode or pure hydraulic drive mode to a hybrid drive mode which is partly mechanical and partly hydraulic, said operating phases also including a phase when a second one of the hydraulic switches changes the transmission from an energy recovering braking mode to a drive mode, said computer means being operable during said hybrid drive mode to adjust the cylinders to capacities at which the ratio of the torques of the shafts connected to the hydraulic machines are very close to an operating point which cancels input torque to the transmission, said system also having means for controlling engine speed with respect to vehicle speed.

2. The system of claim 1 wherein an engine associated with the transmission is provided with an injection pump, and said means for controlling engine speed acts on the injection pump.

3. The system of claim 1 wherein the computer means is operable to shift the operating point slightly beyond a point (P2) where the input torque is entirely cancelled.

4. The system of claim 1 having a torque converter which is provided with two converter elements, a controlled clutch which is operable to engage when the relative slip between the converter elements have fallen to a minimum value whereby the clutch operates as a lock-up clutch, said computer means during starting operations of the system being operable to control said switches and machines only after said lock-up clutch has engaged.

5. A hydropneumatic system for recovering braking energy for a vehicle comprising a power "shunt" transmission of known type comprising a differential mechanism having four shafts (1, 2, 3, 4) coupled respectively to the output from a torque converter (6), to the wheels and to two hydraulic machines or sets of machines (3a and 4a), with ratios set so as to give efficiency the advantage in this continuous transmission, with one of these shafts (4) being mounted on a freewheel (15) operating when starting on the torque converter, with the said system comprising, in addition to the said transmission, a hydropneumatic accumulator (17) connected to the hydraulic machines of said transmission, in order to provide hybrid or mixed operation, by means of two hydraulic switches (19 and 20) automatically controlled by an electronic computer (21) said computer also comprising means for varying the cylinder capacities (Cy3, Cy4) of the two hydraulic machines or sets of hydraulic machines (3a, 4a) so as to automatically and continuously assure the various operating phases of the transmission, and in particular the changeover from pure, mechanical or hydraulic, drive to hybrid drive (through 19) and from energy recovery braking to drive (through 20), characterized in that, in the hybrid drive phase, the cylinder capacities (Cy3, Cy4) are set so that the ratio (C4/C3) of the torques of the corresponding shafts are very close to the point (P2) corresponding to cancellation of the input torque (C1) and in that a means is also provided of controlling the engine speed with respect to vehicle speed.

6. The system according to claim 5, characterized in that the control device acts on the engine feed, notably on the injection pump.

7. The system according to claim 5, characterized in that the control system comprises the computer itself which acts so as to shift the operating point slightly beyond the point (P2) corresponding to strict cancellation of the input torque (C1).

8. The system according to claim 5, characterized in that the torque converter (6) inserted between the engine (5) and the input shaft (1) of the mechanism (10) comprises, in a known manner, a lock-up device formed by a controlled clutch coming into action when the relative slip between the two converter elements has fallen to a minimum value, characterized in that, during each starting operation, the various energy recovery and restoration phases commanded by the electronic computer (21) only occur after this lock-up clutch has been put into operation.

* * * * *